Patented Jan. 19, 1926.

1,570,514

UNITED STATES PATENT OFFICE.

RUDOLF MEINGAST AND MARTIN MUGDAN, OF MUNICH, GERMANY, ASSIGNORS TO CONSORTIUM FÜR ELEKTROCHEMISCHE INDUSTRIE G. M. B. H., OF MUNICH, GERMANY.

PROCESS OF MANUFACTURING ACETIC ANHYDRIDE.

No Drawing. Application filed March 6, 1923. Serial No. 623,161.

*To all whom it may concern:*

Be it known that we, Dr. RUDOLF MEINGAST, citizen of Austria, and Dr. MARTIN MUGDAN, citizen of Germany, residing at Munich, Germany, 20 Zielstattstrasse, have invented certain new and useful Improvements in Processes of Manufacturing Acetic Anhydride, of which the following is a specification.

We have found that a good yield of acetic anhydride may be economically produced when acetic acid vapors are heated to a high temperature. It is necessary to avoid excessive temperatures. It is also necessary that such substances as catalyze the formation of undesirable by-products be avoided. Among such by-products are acetone, hydrocarbons and carbonic acid. In Annales de Chimie et de Physique (3 Vol. 33 page 300) it is stated that Berthelot passed acetic acid through a red hot tube. Since the temperature was too high he obtained mainly aromatic and gaseous compounds. The formation of acetic anhydride is not mentioned. Also the records of other chemists who passed vapors of acetic acid through tubes partially filled with metal or coal, make no mention of the formation of acetic anhydride. At high temperatures decomposition occurred with formation of carbon dioxide and combustible gases. At low temperatures the acetic acid remained unchanged.

When acetone is made from acetic acid by the use of catalysts specific for the reaction, no substantial amount of acetic anhydride is produced. This has been proven by the use of alumina and cerium oxide. These and similar materials are to be avoided if acetic anhydride is desired, since in their present decomposition will take place forming methane, acetone and carbonic acid.

We will now give several examples of the proper procedure in preparing acetic anhydride from acetic acid according to our invention.

*Example 1.*

A glass, quartz or silver tube is filled with 20 grams of granulated fire clay or pumice. The tube is heated so that the temperature at the exit end of the catalyst is kept at about 650° C. Acetic acid vapors are passed through this tube at the rate of 60 grams per hour. The products of the reaction are collected in a cooled receiver and consist of a mixture of acetic anhydride, acetic acid and water, the acetic anhydride comprising about 20% of the mixture. Very little in the way of undesirable by-products are formed. It is of advantage to chill the products of the reaction by refrigeration so that they are condensed as soon as possible after leaving the reaction zone.

*Example 2.*

The reaction is carried out as in Example 1 but a tube is used which is constricted at its hottest point just beyond the catalyst. This constricted portion of the tube leads into a passage surrounded by a refrigerating agent such as ice and salt. Dilution of the acetic acid and vapor prior to reaction with an inert gas such as nitrogen is of advantage for decreasing decomposition. This dilution of the acetic acid vapor may also be advantageously accomplished by the use of an inert volatile liquid such as a hydrocarbon which will have a cooling effect in the reaction zone and will aid in separating the water from the reaction product. Liquids of low boiling point are preferred.

*Example 3.*

The reaction is carried out as in Example 1 or Example 2 but a considerable quantity of benzol is added to the vapors formed by the reaction and before they are to be condensed. This results in the condensation of a turbid liquid from which most of the water separates out as a separate layer.

As a catalyst suitable for the desired reaction one may use the chlorides of the alkali metals, or phosphates. By using pumice or the like porous carriers which have been impregnated with these materials the temperature necessary for the formation of anhydride from acetic acid is lowered.

*Example 4.*

The reaction is carried out as in Example 1, except that fused and granulated sodium chloride is used as a catalyst in the heated tube. In this case acetic anhydride is formed at as low a temperature as 550° C.

Many catalysts for acetic anhydride formation lose their efficiency after a few hours. After some hours of operation they gradually become covered with a layer resembling soot. On being heated in air or oxygen their activity is restored but only temporarily. The catalysts which suffer least in this manner are the phosphates, more particularly the phosphates of the alkaline earth and earth metals, such as zinc and cerium and especially aluminum and the metals of the aluminum group. These catalysts may be used singly or together and they may be used by being fixed on or distributed in carriers such as pumice. The acid phosphates act more favorably than the neutral orthophosphates and the metaphosphates seem to be the most effective. If phosphates of too great acidity are used, free phosphoric acid is liberated at the high temperatures used and this causes regeneration of acetic acid. This difficulty may be avoided by heating the phosphate to at least 700° C. before using it as catalyst.

*Example 5.*

7½ parts of hydrated lime are dissolved in 61 parts of 32% hot orthophosphoric acid and 65 parts by weight of small pieces of pumice are saturated with this solution. The mass is then dried and heated to 900° C. The resultant material may be placed in a tube as in Example 1. A rapid current of acetic acid vapor when passed over this catalyst at 600° C. gives a product, which when condensed, contains 50° acetic anhydride, the balance being mainly water and acetic acid.

After about 12 hours' operation the activity of the catalyst is found to diminish but may be renewed by heating in a current of air or oxygen.

*Example 6.*

8 parts by weight of aluminum hydroxide (64% $Al_2O_3$) are dissolved in 46 parts of hot 32% orthophosphoric acid and the resulting solution used to saturate 25 parts of pumice. The catalyst is finished by being heated to 850° C. and gives good results when used at 600° C. This catalyst has a longer life than that mentioned in Example 5 and may be likewise restored to its original efficiency by heating in oxygen.

*Example 7.*

23 parts of yttria are dissolved in 25 parts of hot concentrated hydrochloric acid and 17.5 parts of 84% phosphoric acid are added to the mixture. 25 parts of pumice are saturated with this solution, dried, heated a half hour at 900° C. and used as a catalyst. At 600° C. a yield of 60% anhydride may be obtained.

*Example 8.*

7 parts of aluminum hydroxide (64% $Al_2O_3$) and one part of yttria are dissolved in 17.4 parts of 84% phosphoric acid. 25 parts of pumice are impregnated with this solution, dried and heated to redness. When acetic acid vapors are passed over this catalyst at 600° C. a yield of 60% of anhydride is obtained.

The crude product as obtained according to the above examples may be freed from most of the water by adding a liquid which is immiscible with water but miscible with the anhydride, and by decantation. The rest of the water may be renewed by treatment with a hygroscopic solid followed by filtration. The solvent, acetic acid and acetic anhydride may then be separated by fractionation.

However, the simplest method of separation of acetic anhydride from the water in the crude product is by fractional distillation under considerably reduced pressure. This avoids large losses of anhydride which if distilled with water and acetic acid and at ordinary pressure would react with water to form acetic acid. After the water has been separated, the acetic acid can be separated from the acetic anhydride by fractionation at ordinary atmospheric pressure. Over 80% of the acetic anhydride produced may be thus isolated. The acetic acid fraction may be returned to the process.

In the appended claims, the expression "a dehydrating catalyst comprising a metal salt" is intended to cover the use of such salts as are mentioned in the above examples, and their equivalents, whether used with a carrier or extender material or not.

The expression "earth metal salt" as used herein is intended to cover the alkaline earth metals as well as the metals of the aluminum group, and the metals of the rare earths.

What we claim is:—

1. The process of manufacturing acetic anhydride which consists in heating the vapors of acetic acid to from 400° C. to 800° C. in the absence of base metals and of metal oxides.

2. The process of manufacturing acetic anhydride which consists in heating the vapors of acetic acid to from 400° C. to 800° C. in the presence of a dehydrating catalyst comprising a metal salt of a strong mineral acid, which salt is stable in the presence of acetic acid at the temperature used.

3. The process of manufacturing acetic anhydride which consists in heating the vapors of acetic acid to from 400° C. to 800° C. in the presence of a dehydrating catalyst comprising an earth metal salt of a strong mineral acid, which salt is stable in the presence of acetic acid at the temperature used.

4. The process of manufacturing acetic anhydride which consists in heating the vapors of acetic acid to from 400° C. to 800° C. in the absence of base metals and of metal oxides and quickly chilling the products of the reaction by refrigeration.

5. The process of manufacturing acetic anhydride which consists in heating the vapors of acetic acid to from 400° C. to 800° C. in the presence of a dehydrating catalyst comprising a metal salt of a strong mineral acid, which salt is stable in the presence of acetic acid at the temperature used, and quickly chilling the products of the reaction by refrigeration.

6. The process of manufacturing acetic anhydride which consists in heating the vapors of acetic acid to from 400° C. to 800° C. in the absence of base metals and of metal oxides and isolating the acetic anhydride.

7. The process of manufacturing acetic anhydride which consists in heating the vapors of acetic acid to from 400° C. to 800° C. in the presence of a dehydrating catalyst comprising a metal salt of a strong mineral acid, which salt is stable in the presence of acetic acid at the temperature used and isolating the acetic anhydride.

8. The process of manufacturing acetic anhydride which consists in heating the vapors of acetic acid mixed with an inert gas to from 400° C. to 800° C. in the absence of base metals and of metal oxides.

9. The process of manufacturing acetic anhydride which consists in heating the vapors of acetic acid mixed with an inert gas to from 400° C. to 800° C. in the presence of a dehydrating catalyst comprising a metal salt of a strong mineral acid, which salt is stable in the presence of acetic acid at the temperature used.

10. The process of manufacturing acetic anhydride which consists in heating the vapors of acetic acid to from 400° C. to 800° C. in the absence of base metals and of metal oxides and separating the water from the product of the reaction by fractional distillation under reduced pressure.

11. The process of manufacturing acetic anhydride which consists in heating the vapors of acetic acid to from 400° C. to 800° C. in the presence of a dehydrating catalyst comprising a metal salt of a strong mineral acid, which salt is stable in the presence of acetic acid at the temperature used, and separating the water from the product of the reaction by fractional distillation under reduced pressure.

12. The process of manufacturing acetic anhydride which consists in heating the vapors of acetic acid to from 400° C. to 800° C. in the presence of a dehydrating catalyst comprising a metal salt of a strong mineral acid which has previously been heated to above 700° C. and which salt is stable in the presence of acetic acid at the temperature used.

13. The process of manufacturing acetic anhydride which consists in heating the vapors of acetic acid to from 400° C. to 800° C. in the presence of a dehydrating catalyst comprising an earth metal phosphate.

14. The process of manufacturing acetic anhydride which consists in heating the vapors of acetic acid to from 400° C. to 800° C. in the presence of a dehydrating catalyst comprising a phosphate of a metal of the aluminum group.

15. The process of manufacturing acetic anhydride which consists in heating the vapors of acetic acid to from 400° C. to 800° C. in the presence of a dehydrating catalyst comprising a phosphate of aluminum.

16. The process of manufacturing acetic anhydride which consists in heating the vapors of acetic acid to from 400° C. to 800° C. in the presence of a dehydrating catalyst comprising a metal phosphate.

In testimony whereof we have hereunto set our hands.

Dr. RUDOLF MEINGAST.
Dr. MARTIN MUGDAN.